United States Patent [19]
O'Rourke

[11] Patent Number: 6,107,565
[45] Date of Patent: Aug. 22, 2000

[54] COVERED ENERGY TRANSMISSION LINE CARRIER

[75] Inventor: James D. O'Rourke, Pewaukee, Wis.

[73] Assignee: A&A Manufacturing Co., Inc., New Berlin, Wis.

[21] Appl. No.: 09/193,596

[22] Filed: Nov. 17, 1998

[51] Int. Cl.[7] ............................. H02G 15/24; F16G 13/16
[52] U.S. Cl. ........................ 174/21 JS; 174/101; 59/78.1
[58] Field of Search .................. 174/68.1, 68.3, 174/21 JS, 97, 101, 111, 136; 59/78.1, 79.3, 82, 85; 138/120, 155, 168; 248/49, 78

[56] References Cited

U.S. PATENT DOCUMENTS

| | | | |
|---|---|---|---|
| 1,854,815 | 4/1932 | Turner | 138/155 |
| 3,161,205 | 12/1964 | Merker | 137/355.17 |
| 3,330,105 | 7/1967 | Weber | 59/78.1 |
| 3,772,875 | 11/1973 | Viano | 59/78.1 |
| 3,957,084 | 5/1976 | Jung | 138/122 |
| 4,084,370 | 4/1978 | Moritz | 59/78.1 |
| 4,104,871 | 8/1978 | Moritz | 59/78.1 |
| 4,163,591 | 8/1979 | Hennig et al. | 308/3.5 |
| 4,228,825 | 10/1980 | Moritz et al. | 138/120 |
| 4,499,720 | 2/1985 | Klein | 59/78.1 |
| 4,658,577 | 4/1987 | Klein | 59/78.1 |
| 4,907,767 | 3/1990 | Corsi et al. | 248/49 |
| 5,108,350 | 4/1992 | Szpakowski | 474/207 |
| 5,163,281 | 11/1992 | Kanehira et al. | 59/78.1 |
| 5,184,454 | 2/1993 | Klein et al. | 59/78.1 |
| 5,240,209 | 8/1993 | Kutsch | 248/49 |
| 5,254,809 | 10/1993 | Martin | 174/68.1 |
| 5,435,606 | 7/1995 | Navazo | 174/68.3 X |
| 5,863,148 | 11/1998 | Fukao | 59/78.1 |

FOREIGN PATENT DOCUMENTS 1449670  12/1968  Germany .

*Primary Examiner*—Kristine Kincaid
*Assistant Examiner*—Chau N. Nguyen
*Attorney, Agent, or Firm*—Quarles & Brady LLP

[57] ABSTRACT

An energy transmission line carrier for supporting and enclosing flexible cable, hoses or other conduit is made of two parallel chains of side links that are pivotally joined end to end with snap-fit connections. One end of each side link has stop elements that limit the angular motion of the chain to only one direction from a generally straight position and to a certain radius when fully pivoted. The side links have two sets of opposing fingers and troughs for receiving the beaded edges of lateral covers, the troughs on one side of the chains having a lead-in to ease the insertion of the beaded cover. The fingers and troughs limit lateral movement and resist separation of the covers laterally and transversely, while permitting longitudinal sliding of the covers relative to the side chains. The covers flex longitudinally and slide between the troughs and fingers as the side links pivot, and for assembly and disassembly of the covers to the side chains.

14 Claims, 4 Drawing Sheets

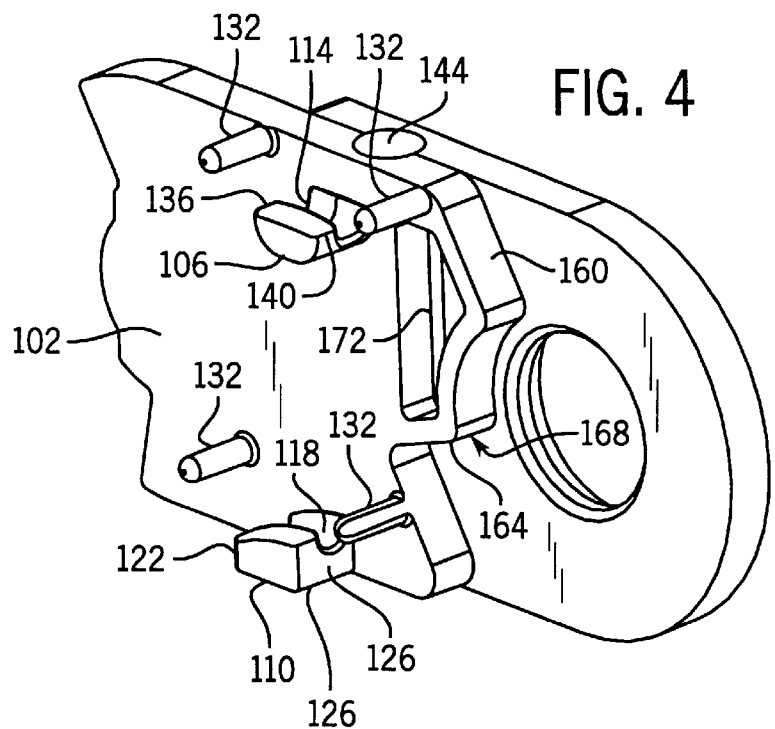
FIG. 4
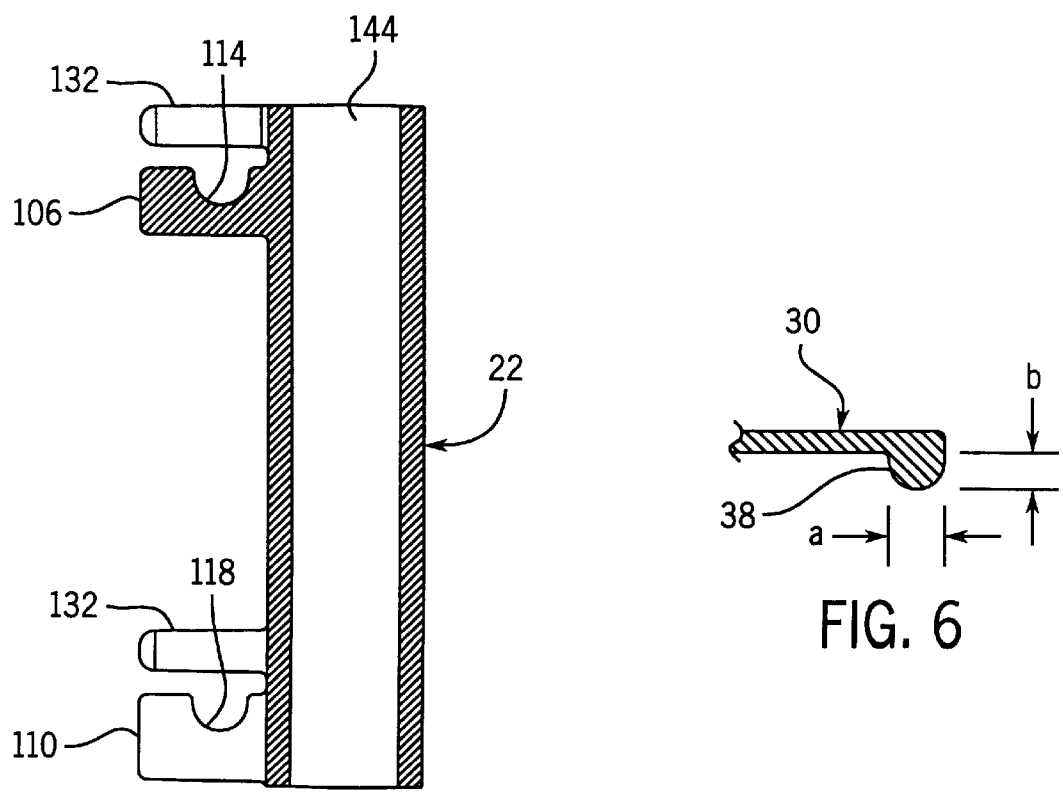
FIG. 5
FIG. 6

COVERED ENERGY TRANSMISSION LINE CARRIER

FIELD OF THE INVENTION

This invention relates to a carrier for supporting hoses, cables, and other energy transmission lines. Particularly, the invention is a self-supporting energy transmission line carrier made of parallel side links pivotally connected end to end and joined laterally by one or more parallel, flexible covers.

BACKGROUND OF THE INVENTION

Carrier chains for supporting cables, hoses and other flexible conduit extending from one location to a location movable in a relatively straight line are well known. Szpakowski U.S. Pat. No. 5,108,350 and Klein U.S. Pat. No. 5,184,454 disclose carrier chains made up of two parallel chains of side links interconnected end to end, which permit pivoting between the links in only one direction from a straight or slightly cambered extended position. The links may be molded with limiting members of various sizes to create carrier chains with a variety of pivot radii.

The side links have grooves or other interfitting structure with which cross-links of various cross-sections are interconnected. A carrier is formed when one chain of connected side links is laterally cross-linked to a second chain with the chains having pivot axes in common. The carriers may be assembled, without the use of tools, by fixing a cross-link to a side link, for example with a snap fit, and are disassembled by reversing the process. A cross-link may be connected to every link or fewer than every link. The cross-links may be bar-like members that laterally connect two side chains leaving a substantially open top and bottom, or may be covers with curved ends to substantially close off the space inside the carrier.

The prior art also discloses carriers with separate, longitudinally continuous covers. For example, Merker U.S. Pat. No. 3,161,205 discloses a longitudinally flexible band with cable-supporting members thereon having rollers for movement along parallel rails which support and guide the carrier. Also, Weber U.S. Pat. No. 3,330,105 reveals an enclosed carrier with cylindrical cross-links and lateral separators, through which is inserted a sheet metal band cover between separating web members and roller members which extend between the opposite side plates. Moritz U.S. Pat. No. 4,084,370 discloses another carrier using a sheet metal band as a cover.

Carriers with individual cross-links or covers fixed to the side plates require many parts, making manufacture, assembly, and disassembly more difficult. Carriers with individual covers, whether or not integrally molded with the links, can have pinch points, which can also permit dirt and debris to enter the carrier. Sheet metal band covers can have sharp edges which can abrade the cables and hoses, require an open joint at the sides, and can be difficult to handle in long sections. In addition, with such bands, separate cross-links must typically be provided to hold the side chains in lateral and transverse alignment.

SUMMARY OF THE INVENTION

The invention provides an energy transmission line carrier for supporting flexible conduit from one location to a linearly movable location which addresses the above concerns. The carrier has at least two parallel, articulated chains of side links pivotally connected end to end and a longitudinally flexible cover which extends laterally between the chains so as to border a space between the side chains for receiving energy transmission lines. The cover has an edge bead which is received in troughs of the side chain with a form fit so as to resist lateral separation of the cover from the side chain. Thereby, the cover protects the lines inside the carrier and spaces the chains laterally apart so as to provide quiet and smoot operation in a carrier of the invention.

Fingers of the chains are preferably provided to hold the bead in the troughs so as to resist transverse separation of the bead from the trough. Preferably, while a friction fit may to some extent resist longitudinal sliding of the bead in the trough, sliding of the bead and cover longitudinally may be accomplished manually so as to assemble and disassemble the cover to and from the chain, and permit bending of the carrier.

The cover laterally joins the two chains without using a separate cross-linking member to connect segments of parallel links, while maintaining structural integrity and mobility. This is accomplished by slidably disposing the edge beads of the longitudinally flexible covers within the troughs of the chain while holding them in the troughs with the fingers.

A further objective of the invention is to provide a simple, quick, and cost effective means for varying the width of the carrier. Simply replacing the covers with wider or narrower covers varies the width of the carrier. This objective may be accomplished with covers that are extruded, rather than molded, from inexpensive flexible plastic materials. The resulting cover has no sharp edges, is easy to assemble to the side plates so as to enclose the contents of the carrier with substantially closed joints at the sides, with no sharp edges, and to position the side plates relative to one another.

Easy removal of one or both covers also facilitates inspection of the contents of the carrier without time consuming disassembly of the carrier. According to the invention, an end of one cover may be slid out of the side links, without collapsing the carrier, so that the contents of the carrier can be inspected. In addition assembly of the covers to the side chains may be either by longitudinal sliding of the cover beads into the troughs, by lateral snapping of the beads into the troughs, or by flexing the cover up over the trough and releasing it, utilizing the stiffness of the cover to hold the bead in the trough, with the fingers on one side of the cover and the bead in the trough on the other side.

The foregoing and other objects and advantages of the invention will appear from the following description. In this description reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

BRIEF DESCRIPTION OF THE DRAWINGS

FIG. 4 is a perspective view illustrating the inside of the side link of FIG. 3;

FIG. 5 is a sectional view from the plane of the line 5—5 of FIG. 2;

FIG. 6 is a sectional view from the plane of the line 6—6 of FIG. 2;

DETAILED DESCRIPTION OF THE PREFERRED EMBODIMENT

Figure 1:
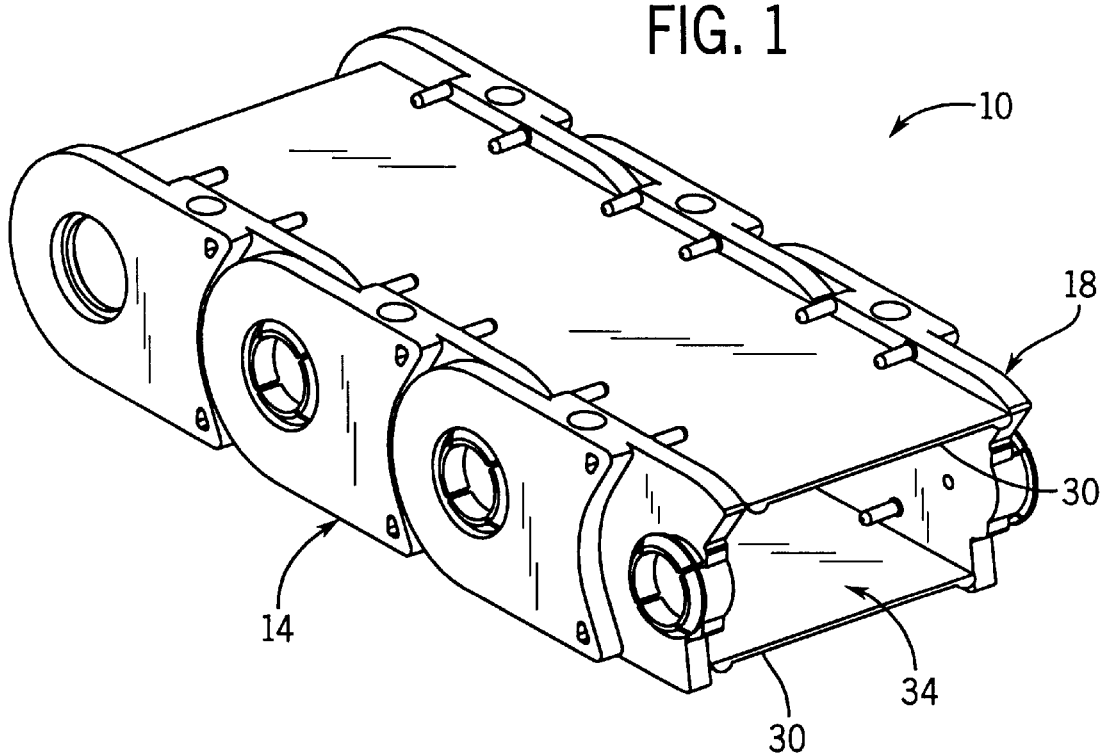
FIG. 1 is a perspective view of an energy transmission line carrier incorporating the invention.
Figure 2:
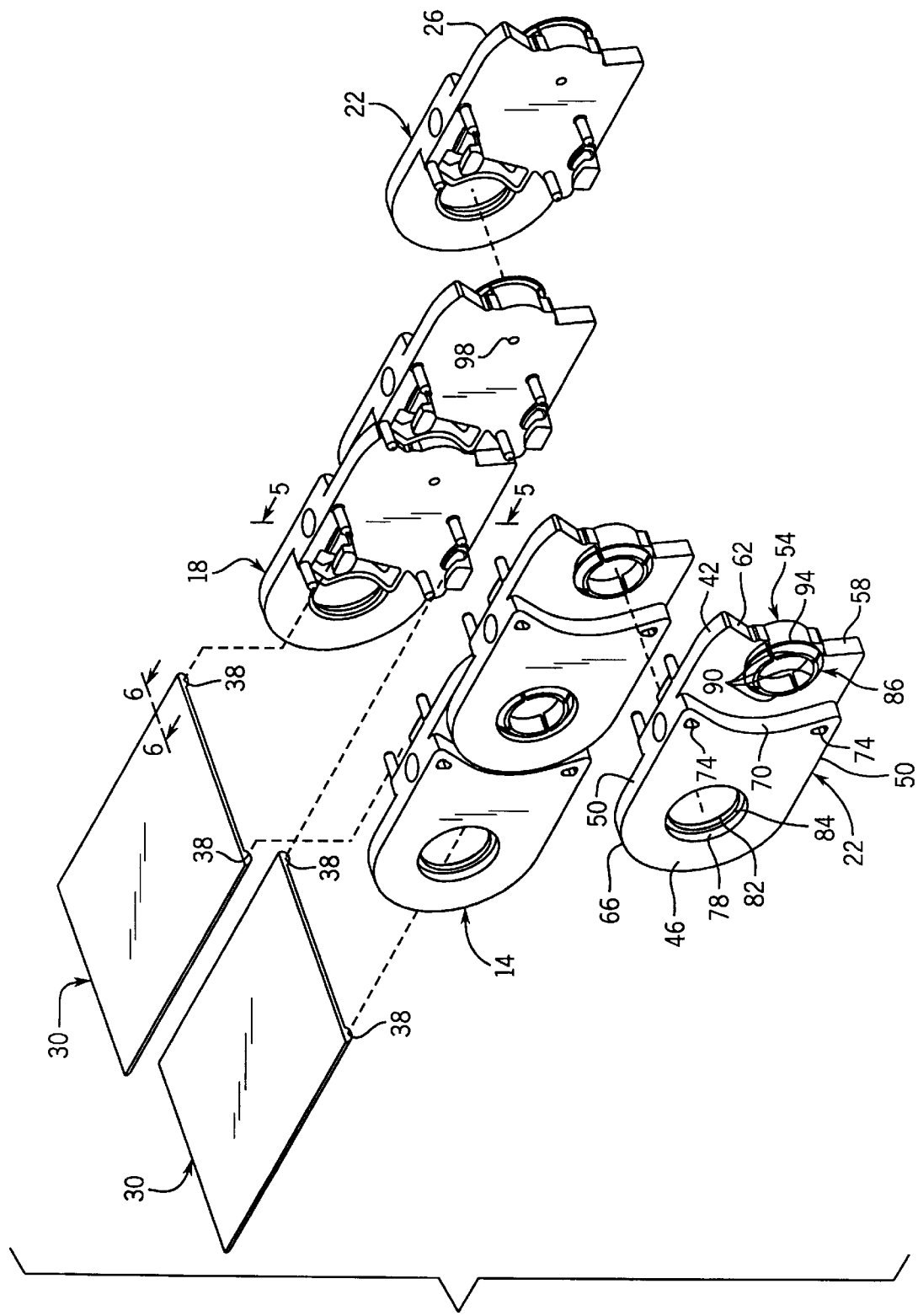
FIG. 2 is an exploded perspective view of the energy transmission line carrier of FIG. 1.

FIG. 1 illustrates an energy transmission line carrier 10 for supporting and enclosing flexible hoses, cables or other conduit (not shown) typically used to supply energy, e.g., electrical, hydraulic, or pneumatic, to machines that move back and forth in a relatively straight line. In accordance with the invention, the carrier 10 bends only in one, typically upward, direction from a generally straight position, and thus, is able to span distances without collapsing. As shown in FIG. 2, the carrier 10 has a first chain 14 and a second chain 18 formed by interconnected side links 22, 26 which are pivotally joined end to end.

At least two parallel cover bands 30 laterally unite the first chain 14 with the second chain 18 to define an enclosed space 34. The cover bands 30 are longitudinally flexible and are extruded to have their interior portions be a relatively uniform approximately 0.030 inches thick. The covers 30 may be extruded from a suitable flexible plastic material, such as polypropylene. Depending from each lateral (longitudinally extending) edge of each the cover 30, on only one transverse side of the cover 30, is a longitudinal bead 38 which extends for the length of the cover 30. Each beads 38 has a substantially semi-circular profile (FIG. 6) and a greater thickness than the interior portions of the cover 30, each bead being approximately 0.040 by 0.040 inches (lateral a by transverse b dimension as shown in FIG. 6).

The covers are extruded to the desired longitudinal and lateral dimensions. In the preferred embodiment, the carrier has two longitudinally flexible covers that extend the length of the carrier to support and enclose energy transmission lines. However, the carrier may be enclosed by a plurality of shorter covers positioned end to end, each of which spans multiple links, with or without spaces in between the covers which are on the same transverse side of the carrier. Also, a cover need not be provided on both transverse sides of the carrier, i.e., only one transverse side may be provided with a cover, some other means being used to hold the side plates apart on the other transverse side.

Figure 3:
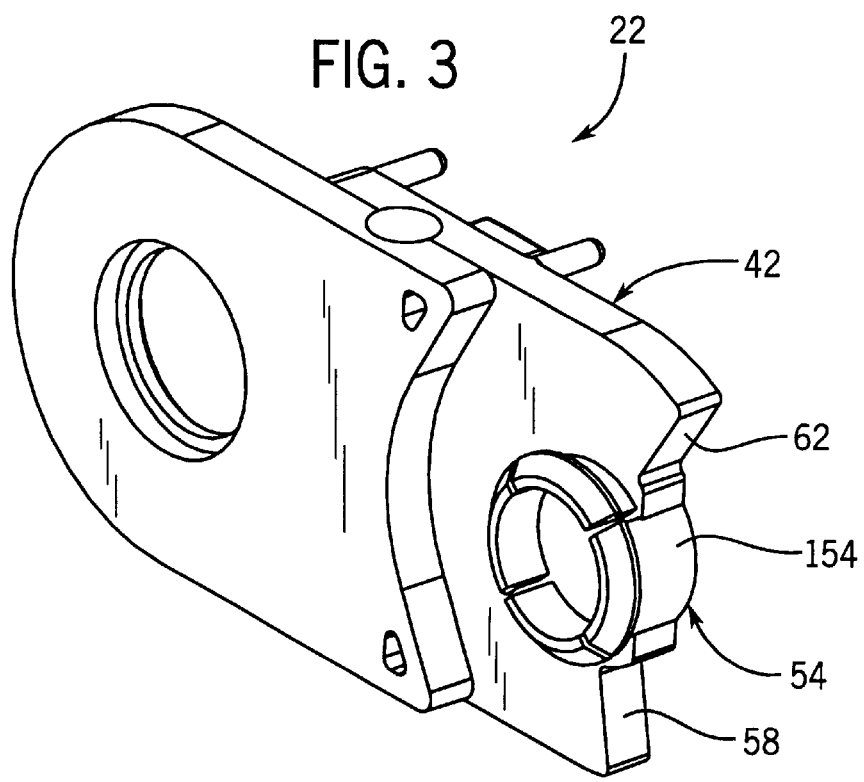
FIG. 3 is a perspective view illustrating the outside of a side link of a chain of the energy transmission line carrier of FIG. 1.

All of the links 22 in the first chain 14 are identical and, as illustrated in FIG. 2, the side links 22 of the first chain 14 are mirror images of the side links of the second chain 18. Accordingly, only one of the links will be described. Referring to FIGS. 3 and 4, a side link 22 comprises an inside longitudinal section 42 and an integral outside longitudinal section 46 that are offset laterally one against the other from the central plane of the link 22 so that when multiple links 22 are interconnected, the links 22 form a chain 14 of generally uniform thickness. The links may be molded from a suitable rigid plastic material, such as glass filled nylon.

The perimeter of a link 22 is defined by two parallel, longitudinally extending transverse sides 50, a front edge 54 of the inside longitudinal section 42 having stop elements 58, 62, and a rounded back edge 66 of the outside longitudinal section 46 of a radius facing the hyperbolic front edge 70 of the outside longitudinal section 46. There are two blind substantially triangular voids 74 in the outside longitudinal section 46 where it overlaps the section 42, which serve to reduce material as well as limit excessive material shrinkage resulting from the molding process.

A circular pivot aperture 78 is transversely centered through the outer longitudinal section 46 having an inner ring 82 of lesser diameter than the remainder of the pivot aperture 78 so as to create an axially facing shoulder 84. A circular pivot post 86 of a diameter slightly smaller than the diameter of the pivot aperture 78 is transversely centered on the inside longitudinal section 42 extending laterally approximately the thickness of the outside longitudinal section 46. The pivot post 86 comprises four radial sections 90 which terminate in a lip 94 forming a frusto-conical outline with a shoulder that snaps into facing engagement with the shoulder 84. Links 22 are interconnected by hand snapping the pivot post 86 of one side link 22 into the pivot aperture 78 of a connecting side link 22. In detail, the radial sections 90 of the pivot post 86 are forced radially inward so that the lip 94 passes through the inner ring 82 of the pivot aperture 78. Once through the inner ring 82, the radial sections 90 return to their original position with the inner ring 82 beneath the shoulder of the lip 94, thereby coupling the two links.

Through the center of the pivot post 86 is a small lateral bore 98 used principally during the molding process. The bore 98 may be used, however, for attaching a cap (not shown) over the pivot joint. The bore 98 may also be used for receiving the end of a lateral divider member (not shown).

On the inner surface 102 of the inside longitudinal section 42 are first 106 and second 110 laterally inwardly extending trough elements positioned longitudinally between the pivot post 86 and the pivot aperture 78 adjacent to the respective longitudinally extending sides 50. Formed in the trough elements 106, 110 are respective longitudinally extending troughs 114, 118 which open in the transverse direction toward the outside pivotal radius of the carrier 10. The troughs or openings 114, 118 in the trough elements 106, 110 have a semi-circular lateral cross-section of a diameter slightly larger than the edge beads 38 on the covers 30. The trough 114 of the first trough element 106 extends longitudinally, and the trough 118 of the second trough element 110 extends longitudinally at a transverse angle or curvature from the front edge 122 to the back edge 126 of the trough, thus providing a lead-in, facilitating feeding the beaded edges 38 of a cover 30 into the trough element 106. This tapered shape of the trough element being positioned at the inner radius side of the carrier also helps the cover 30 on that side assume a smaller radius, as is required of it. The lateral sides of the troughs confront the lateral sides of the edge beads to resist lateral separation of the beads from the troughs, while permitting longitudinal sliding of the beads in the troughs.

As illustrated in FIG. 5, fingers 132 are spaced transversely from the trough elements 106, 110 forming a path through which the respective cover 30 may slide when the carrier 10 is pivoted, but preventing transverse separation of the beads from the troughs. All of the fingers 132 are identical and extend laterally by approximately the lateral dimension of the trough elements 106, 110. The fingers 132 are spaced a transverse distance from the trough openings 114, 118 so that the edge beads 38 of a cover 30 may slide longitudinally in the troughs but not laterally exit the troughs 106, 110. In the preferred embodiment, one finger 132 is positioned at a longitudinal distance from each end 122, 126, 136, 140 of the trough elements 106, 110 in order to provide selective lateral separation of the beads 38 from the trough elements 106, 110 by bowing the cover between the fingers up over the trough element.

At the portion of the links 22 where the longitudinal sections 42, 46 overlap, a transverse through-bore 144 is laterally centered. The through-bore 144 reduces the amount of material used and reduces material shrinkage by reducing the wall thickness. The through-bore 144 may also be used to make connections to the chains, for example, to the links at the ends of the chains to fix them to a machine frame or movable head.

The support stop 62, the pivot stop 58, and a middle portion 154 define the front edge 54 of the inside longitudinal section 42. The support wall 160 and the pivot wall 164 define the portion of the back edge 168 of the inside longitudinal section 42 that contacts the stops 62, 58. The support stop 62 and the support wall 160 are angled radially from the centers of the pivot post 86 and the pivot aperture 78 respectively, so that when interconnected links 22 are in a non-pivoted (straight or generally straight if cambered) position, the support stop 62 of one link 22 makes face-to-face contact with the support wall 160 on the connecting link 22.

When the carrier is not pivoted, the support stop 62 and the support wall 160 are oriented so that the interconnected links 22 form a generally straight line of chain, as shown in FIG. 1. The support stop 62 can be made, however, to bias each coupled link 22 in the pivotal direction. This creates a camber in the chain of interconnected links 22 so that when the carrier 10 is filled with conduit, the load on the unsupported portion of the carrier 10 does not cause the carrier 10 to sag excessively.

Figure 7:
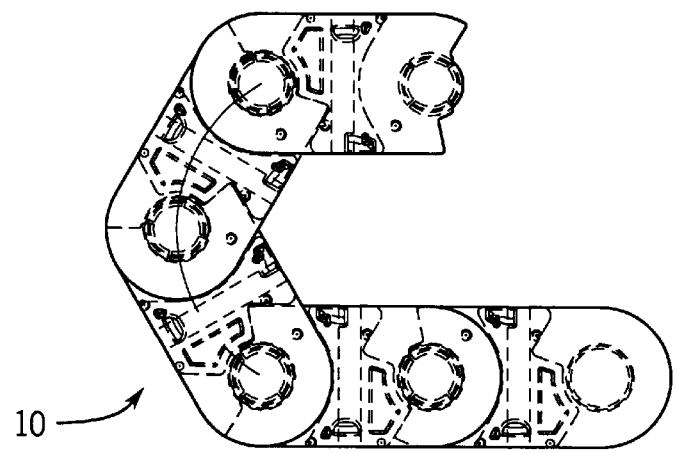
FIG. 7 is a side elevation view of the energy transmission line carrier of FIG. 1 shown fully pivoted.
Figure 8:
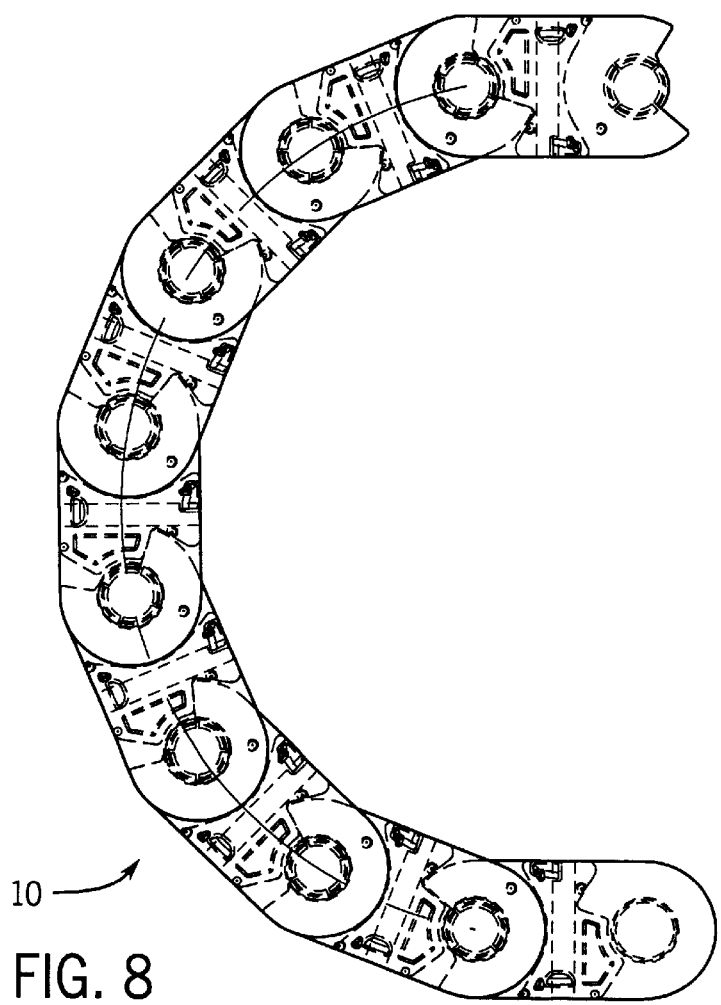
FIG. 8 is a side elevation view similar to FIG. 6, but with the carrier adapted to have an increased curve height.

The pivot stop 58 and the pivot wall 164 are angled radially from the centers of the pivot post 86 and the pivot aperture 78 respectively. When interconnected links 22 are in a fully pivoted position, the pivot stop 58 of one link 22 makes face-to-face contact with the pivot wall 164 on a coupled link 22. The amount of pivot, or curve height, is defined by the size to which the pivot stop 58 is molded; links with larger pivot stops 58 causing a smaller pivot angle, resulting in a larger curve height. FIGS. 7 and 8 show two examples of chains with varied pivot angles or curve heights.

The middle portion 154 of the front edge 54 and the remaining portions of the back edge 168 of the inside longitudinal section 42 are defined so as not to restrict pivoting between interconnected links 22. There is also a void 172 in the inside longitudinal section 42 which reduces material and material shrinkage in the area between the walls 160, 164 that overlaps the outside longitudinal section 46.

The carrier 10 is most efficiently assembled by first connecting the links 22 of each chain 14, 18 by snapping the pivot posts 86 of one link into the pivot aperture 78 of a coupling link 22 until the chains 14, 18 are of the desired length. Then, the edge beads 38 of one cover 30 slide between the first troughs 106 and fingers 132 of the links 22 of one chain 14, 18. Then, the first troughs 106 and fingers 132 are slid over the other edge bead 38 of the cover 30. Alternatively, the cover may be snapped into the troughs laterally. Finally, possibly after loading in the energy transmission lines, the edge beads 38 of the second cover 30 are longitudinally fed into the lead-in of the second troughs 110 from the front edge 54 of the links 22 to the opposite end of the carrier 10.

An illustrative embodiment of the invention has been described in considerable detail for the purpose of disclosing a practical, operative structure whereby the invention may be practiced advantageously. The apparatus described is intended to be illustrative only. The novel characteristics of the invention may be incorporated in other structural forms without departing from the scope of the invention as defined in the following claims.

What is claimed is:

1. An energy transmission line carrier having two longitudinally extending sides, each said side including an articulated chain made up of links which are pivotally connected end to end, and at least one longitudinally flexible cover which extends laterally between the sides and longitudinally spans said links so as to define a space which is bounded by the cover and the sides for receiving energy transmission lines, the improvement wherein:

an edge bead of increased thickness extends longitudinally along at least one edge of said cover; and trough elements are formed on at least one of said sides, said at least one side being adjacent to said edge bead, said trough elements defining longitudinally extending troughs which are shaped to fit with said edge bead in a longitudinally slidable connection;

wherein said edge bead is received in said troughs so as to resist lateral separation of said edge bead from said troughs while permitting longitudinal sliding of said edge bead in said troughs.

2. The energy transmission line carrier of claim 1, wherein said cover extends longitudinally for substantially the length of said carrier.

3. The energy transmission line carrier of claim 1, wherein each link of said at least one side has at least one of said trough elements.

4. The energy transmission line carrier of claim 1, wherein said cover has an additional edge bead along another longitudinally extending edge which is opposite from said one edge, and the other side adjacent to said other edge has said trough elements which define troughs in which said additional edge bead is received, so as to establish a laterally fixed and longitudinally slidable connection between both of said sides and said cover.

5. The energy transmission line carrier of claim 1, further comprising a first finger which extends laterally and is spaced transversely from each said trough so as to hold said bead in said trough transversely.

6. The energy transmission line carrier of claim 5, wherein said finger is spaced longitudinally from each said trough to permit lateral flexing of said cover so as to remove said bead from said trough.

7. The energy transmission line carrier of claim 5, further comprising a second laterally extending finger spaced transversely from each said trough so as to hold said bead in said trough transversely.

8. The energy transmission line carrier of claim 7, wherein said second finger is spaced longitudinally from said trough on a longitudinal side of said trough which is opposite from said first finger to permit lateral flexing of said cover so as to remove said bead from said trough.

9. The energy transmission line carrier of claim 1, wherein said one of said sides has said trough elements along each opposite longitudinally extending edge of said one side, and wherein said at least one longitudinally flexible cover includes two covers, each of which has at least one of said edge beads, the edge bead of one of said covers being received in said troughs of said trough elements which are along one of said longitudinally extending edges of said one side and the edge bead of the other of said covers being received in said troughs of said trough elements which are along the other of said longitudinally extending edges of said one side so as to establish laterally fixed and longitudinally slidable connections between both of said covers and said one side.

10. The energy transmission line carrier of claim 9, wherein the other of said sides of said carrier which is opposite from said one side has said trough elements along each opposite longitudinally extending edge of said second side, and wherein each of said two covers has an additional edge bead along the longitudinally extending edge which is opposite from said one side, said additional edge beads adjacent said other side being received in troughs of said other side of said carrier so as to establish laterally fixed and longitudinally slidable connections between both of said covers and said other side.

11. The energy transmission line carrier of claim 9, wherein said troughs are oriented so as to open in the same transverse direction.

12. The energy transmission line carrier of claim 9, wherein said trough elements along at least one of said longitudinally extending edges each has a lead-in which ramps from a front edge of each said trough element to a rear edge thereof.

13. The energy transmission line carrier of claim 12, wherein said trough elements with said lead-ins are positioned along the longitudinally extending edge of said one side which is on an inner radius side of said carrier.

14. The energy transmission line carrier of claim 1, wherein said bead and said trough have a semi-circular cross section.

* * * * *